(12) United States Patent
Zhang et al.

(10) Patent No.: US 10,578,314 B2
(45) Date of Patent: Mar. 3, 2020

(54) COOKING FUME SEPARATION DEVICE AND FUME EXHAUST DEVICE

(71) Applicant: MIDEA GROUP CO., LTD., Foshan (CN)

(72) Inventors: Hui Zhang, Foshan (CN); Jizhe Zhang, Foshan (CN)

(*) Notice: Subject to any disclaimer, the term of this patent is extended or adjusted under 35 U.S.C. 154(b) by 0 days.

(21) Appl. No.: 16/228,705

(22) Filed: Dec. 20, 2018

(65) Prior Publication Data

US 2019/0128536 A1    May 2, 2019

Related U.S. Application Data

(63) Continuation of application No. PCT/CN2017/084773, filed on May 17, 2017.

(30) Foreign Application Priority Data

Dec. 27, 2016    (CN) .......................... 2016 1 1226266

(51) Int. Cl.
*B01D 45/08*    (2006.01)
*F24C 15/20*    (2006.01)

(52) U.S. Cl.
CPC .......... *F24C 15/2035* (2013.01); *B01D 45/08* (2013.01); *F24C 15/2021* (2013.01)

(58) Field of Classification Search
CPC ... B01D 45/08; F24C 15/2021; F24C 15/2035
(Continued)

(56) References Cited

U.S. PATENT DOCUMENTS 3,566,585 A * 3/1971 Voloshen et al. ... F24C 15/2035
    55/435
3,834,135 A * 9/1974 Jordan ................... B01D 45/08
    55/444
(Continued)

FOREIGN PATENT DOCUMENTS

CN    1091992 A    9/1994
CN    2828604 Y    10/2006
(Continued)

OTHER PUBLICATIONS

The Office Action dated Jul. 17, 2019 in the corresponding EP application No. 17888625.5.
(Continued)

*Primary Examiner* — Minh Chau T Pham
(74) *Attorney, Agent, or Firm* — Kilpatrick Townsend & Stockton, LLP

(57) ABSTRACT

The present disclosure relates to a cooking fume separation device and a fume exhaust device. The fume exhaust device includes the cooking fume separation. The cooking separation device includes a first bracket, a second bracket, a plurality of first separation plates and a plurality of second separation plates. The plurality of first separation plates are fixedly connected to the first bracket, the plurality of second separation plates are fixedly connected to the second bracket, the plurality of first separation plates and the plurality of second separation plates are staggered and spaced apart in an up-down direction, the first separation plate and the second separation plate partially cover each other to form a plurality of separation passages, and the first bracket and the second bracket are movably connected so as to adjust a size of each separation passage.

14 Claims, 5 Drawing Sheets

(58) Field of Classification Search
USPC .............. 55/440, 462, 446, 385.1, DIG. 36; 126/299 E, 299 R
See application file for complete search history.

(56) References Cited

U.S. PATENT DOCUMENTS

| | | | | |
|---|---|---|---|---|
| 3,910,782 | A * | 10/1975 | Struble | B01D 45/08 55/444 |
| 4,175,935 | A * | 11/1979 | Gutermuth | D06F 58/24 55/434.1 |
| 5,522,377 | A * | 6/1996 | Fritz | F24C 15/2035 126/299 D |
| 2005/0000199 | A1 * | 1/2005 | Carter | B01D 45/08 55/442 |
| 2005/0028498 | A1 * | 2/2005 | Entezarian | B01D 50/002 55/320 |
| 2005/0087069 | A1 * | 4/2005 | Entezarian | B01D 45/08 95/272 |
| 2007/0023349 | A1 * | 2/2007 | Kyllonen | B01D 46/0046 210/348 |
| 2007/0163216 | A1 * | 7/2007 | Smasal | B01D 45/08 55/446 |
| 2016/0201923 | A1 * | 7/2016 | Evans | F24C 15/16 126/39 B |

FOREIGN PATENT DOCUMENTS

| | | |
|---|---|---|
| CN | 2937877 Y | 8/2007 |
| CN | 200972187 Y | 11/2007 |
| CN | 201181040 Y | 1/2009 |
| CN | 203024227 U | 6/2013 |
| CN | 203928065 U | 11/2014 |
| CN | 105928029 A | 9/2016 |
| DE | 20005154 U1 | 6/2000 |
| DE | 102006023236 A1 | 11/2007 |
| JP | S5316978 U | 2/1978 |

OTHER PUBLICATIONS

International Search Report dated Sep. 12, 2017 in the corresponding PCT application (application No. PCT/CN2017/084773).
CN First Office Action dated May 11, 2018 in the corresponding CN application (application No. 201611226266.3).

* cited by examiner

COOKING FUME SEPARATION DEVICE AND FUME EXHAUST DEVICE

PRIORITY INFORMATION

The present application is a continuation of international application PCT/CN2017/084773, filed on May 17, 2017, which claims priority to and benefits of Chinese Patent Application Serial No. 201611226266.3, filed with China National Intellectual Property Administration on Dec. 27, 2016, the entire content of which is incorporated herein by reference.

FIELD

The present disclosure relates to a field of fume exhaust technologies, more particularly to a cooking fume separation device and a fume exhaust device.

BACKGROUND

In the related art, a fume exhaust device has low fume exhaust efficiency. When the fume exhaust device is in operation, with increase of a speed level of the fume exhaust device, the air volume increases, the resistance of the cooking fume separation device becomes significantly great, the increment is very apparent, and the noise will also be increased, resulting in poor user experience.

SUMMARY

Embodiments of the present disclosure provide a cooking fume separation device and a fume exhaust device.

The cooking fume separation device of the present disclosure is used for the fume exhaust device. The cooking fume separation device includes a first bracket, a second bracket, a plurality of first separation plates and a plurality of second separation plates. The plurality of first separation plates are fixedly connected to the first bracket, the plurality of second separation plates are fixedly connected to the second bracket, the plurality of first separation plates and the plurality of second separation plates are staggered and spaced apart in an up-down direction, the first separation plate and the second separation plate partially cover each other to form a plurality of separation passages, and the first bracket and the second bracket are movably connected so as to adjust a size of each separation passage.

When the cooking fume separation device of embodiments of the present disclosure is applied to the fume exhaust device, a relative position of the first bracket and the second bracket can be manually or automatically adjusted according to an air volume of a fan of the fume exhaust device, and thus the size of the separation passage can be adjusted, such that the resistance of the cooking fume separation device to the cooking fume will be reduced, and the cooking fume extraction effect will be improved, and meanwhile the noise will be smaller, thereby promoting the user experience.

In some embodiments, the first bracket includes a first horizontal bar and two first vertical bars perpendicular to the first horizontal bar and located at two ends of the first horizontal bar, and the plurality of first separation plates are secured to the first horizontal bar;

the second bracket includes a second horizontal bar and two second vertical bars perpendicular to the second horizontal bar and located at two ends of the second horizontal bar, and the plurality of second separation plates are secured to the second horizontal bar, the second vertical bar defines a groove in a vertical direction, an end of the first horizontal bar and the first vertical bar are slidably embedded in the groove.

In some embodiments, the plurality of first separation plates disposed to the first horizontal bar and the plurality of second separation plates disposed to the second horizontal bar are staggered and spaced apart in the up-down direction, so as to form the separation passages.

In some embodiments, the first separation plate and the second separation plate are strip-shaped, a middle portion of the first separation plate is fixedly connected to the first horizontal bar, and a middle portion of the second separation plate is fixedly connected to the second horizontal bar.

In some embodiments, a section of the first separation plate is arc-shaped, and a section of the second separation plate is arc-shaped.

In some embodiments, a concave surface of the first separation plate is disposed towards an inner side of the cooking fume separation device, and a concave surface of the second separation plate is disposed towards the inner side of the cooking fume separation device.

In in some embodiments, each separation passage includes a first turning section and a second turning section connected sequentially in an airflow direction, the first turning section is configured to turn the airflow through 180 degrees, and the second turning section is configured to turn the airflow output by the first turning section through 180 degrees.

In some embodiments, the cooking fume separation device includes a plurality of gas inlets and a plurality of gas outlets, the gas inlet is communicated with the first turning section, and the gas outlet is communicated with the second turning section.

In some embodiments, the first bracket and the second bracket are detachably connected.

The fume exhaust device according to embodiments of the present disclosure includes a cooking fume separation device according to any embodiment described above.

For the fume exhaust device of embodiments of the present disclosure, the relative position of the first bracket and the second bracket can be manually or automatically adjusted according to the air volume of the fan of the fume exhaust device, and thus the size of the separation passage can be adjusted, such that the resistance of the cooking fume separation device to the cooking fume will be reduced, and the cooking fume extraction effect will be improved, and meanwhile the noise will be smaller, thereby promoting the user experience.

In some embodiments, the fume exhaust device includes the fan, a controller and a driving device. The controller is configured to control the driving device to adjust the relative position of the first bracket and the second bracket according to a rotating speed of the fan.

In some embodiments, the fume exhaust device includes a flue, the cooking fume separation device is mounted to an inner wall of the flue, and the separation passage is communicated with the flue.

In some embodiments, the flue includes a gas inlet section, the gas inlet section is in a tapered shape along a cooking fume airflow direction, and the first bracket is mounted to an inner wall of the gas inlet section.

BRIEF DESCRIPTION OF THE DRAWINGS

Embodiments of the present disclosure will become apparent and more readily appreciated from the following descriptions made with reference to the drawings, in which.

Figure 1:
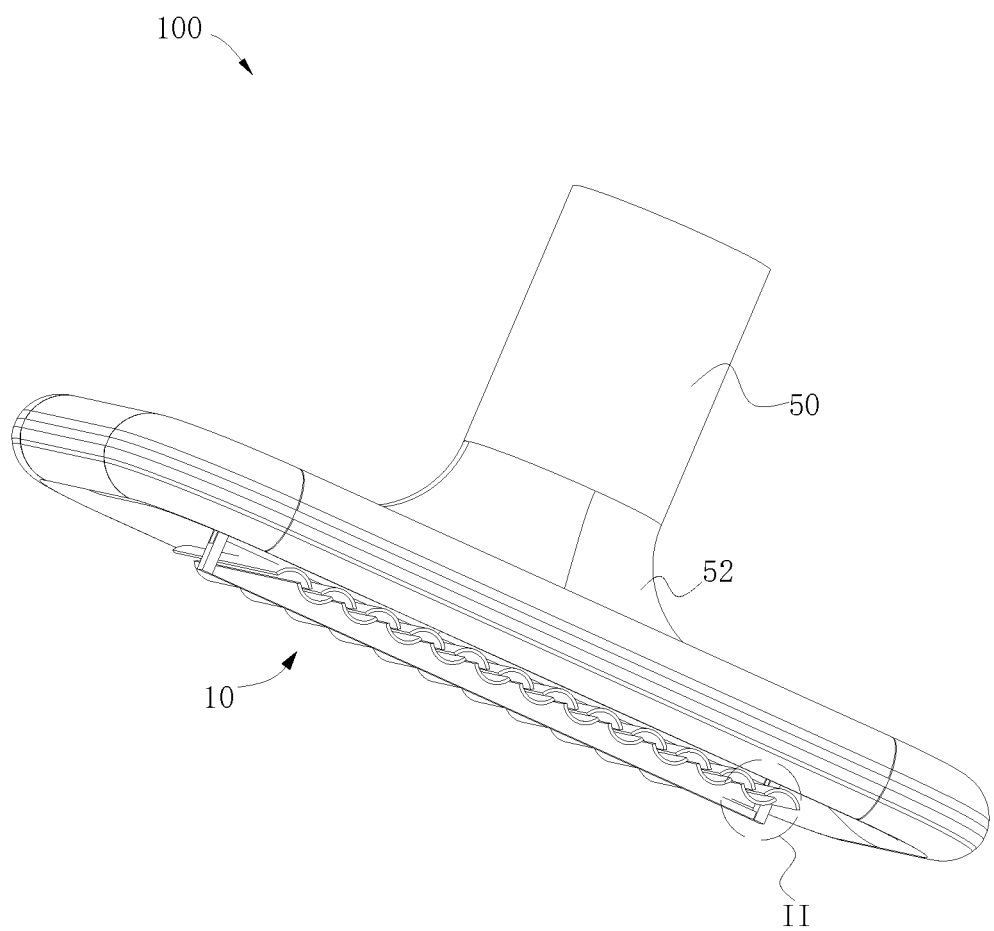
FIG. 1 is a perspective view of a fume exhaust device of an embodiment of the present disclosure.

BRIEF DESCRIPTION OF REFERENCE NUMERALS OF MAIN ELEMENTS fume exhaust device 100, cooking fume separation device 10, first bracket 12, first horizontal bar 122, first vertical bar 124, second bracket 14, second horizontal bar 142, second vertical bar 144, groove 1442, first separation plate 16, second separation plate 18, separation passage 19, first turning section 192, second turning section 194, gas inlet 196, gas outlet 198, fan 20, controller 30, driving device 40, flue 50, gas inlet section 52.

DETAILED DESCRIPTION

Embodiments of the present disclosure will be described in detail and examples of the embodiments will be illustrated in the drawings, where same or similar reference numerals are used to indicate same or similar members or members with same or similar functions. The embodiments described herein with reference to drawings are explanatory, illustrative, and used to generally understand the present disclosure. The embodiments shall not be construed to limit the present disclosure.

In the present disclosure, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations.

Figure 2:
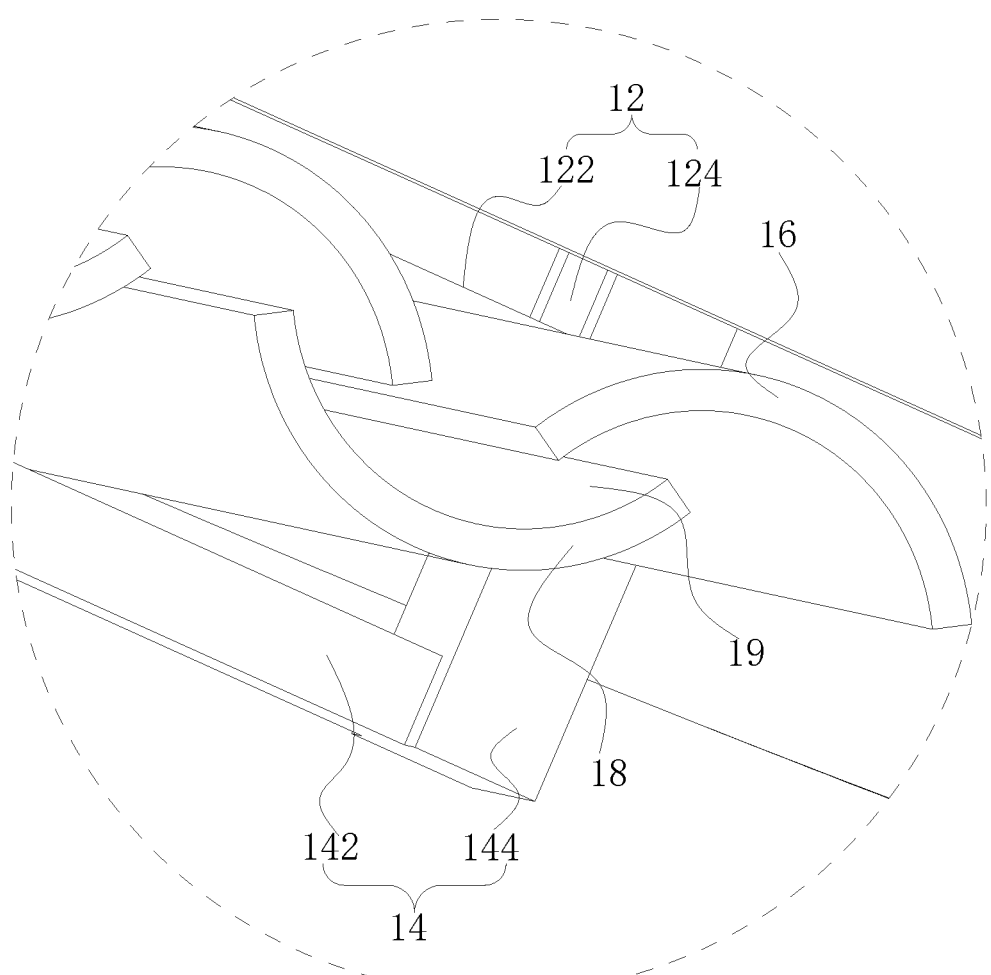
FIG. 2 is an enlarged view of a part II of the fume exhaust device in FIG. 1.
Figure 3:
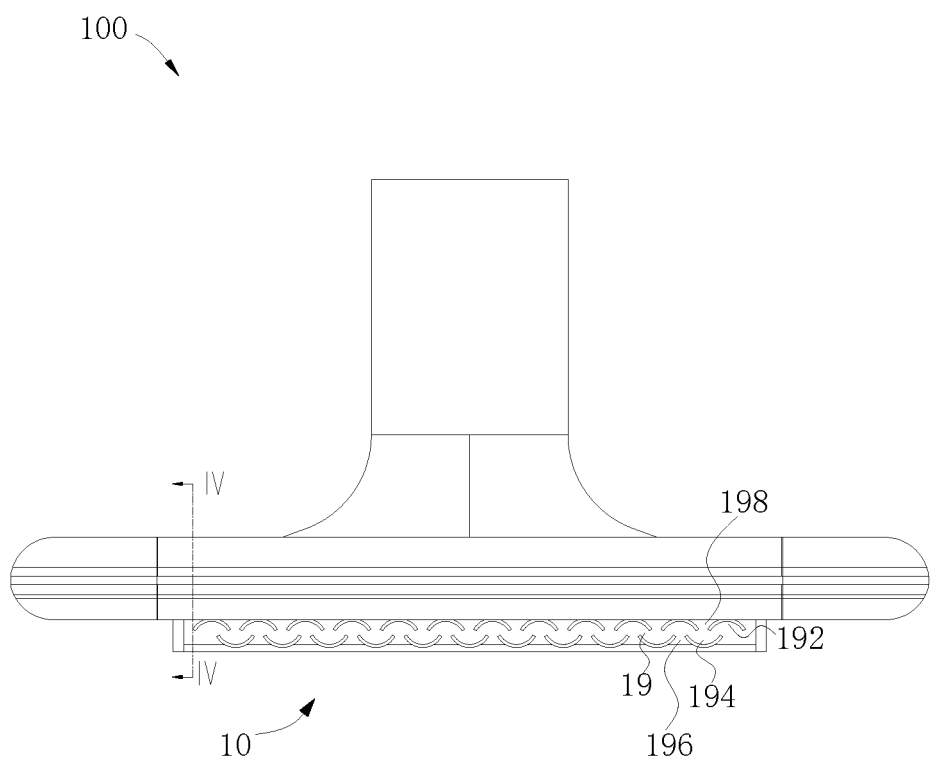
FIG. 3 is a side view of a fume exhaust device of an embodiment of the present disclosure.
Figure 4:
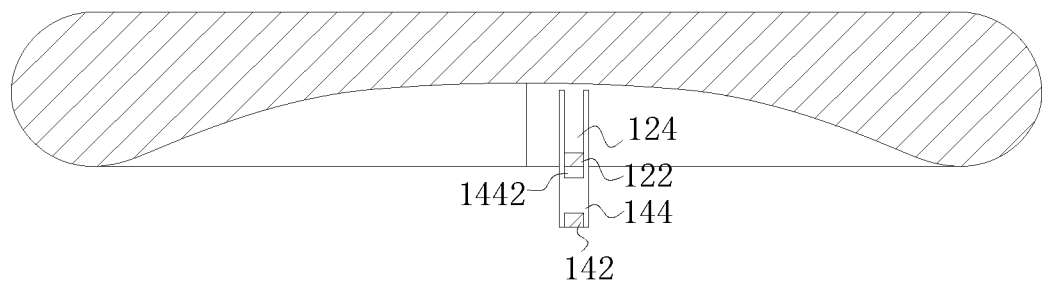
FIG. 4 is a sectional view along line Iv-Iv of the fume exhaust device in FIG. 3.

Referring to FIGS. 1 and 2, a cooking fume separation device 10 of the present disclosure is used for a fume exhaust device 00. The cooking fume separation device 10 includes a first bracket 12, a second bracket 14, a plurality of first separation plates 16 and a plurality of second separation plates 18. The plurality of first separation plates 16 are fixedly connected to the first bracket 12, the plurality of second separation plates 18 are fixedly connected to the second bracket 14, the plurality of first separation plates 16 and the plurality of second separation plates 18 are staggered and spaced apart in an up-down direction, the first separation plate 16 and the second separation plate 18 partially cover each other to form a plurality of separation passages 19, and the first bracket 12 and the second bracket 14 are movably connected so as to adjust a size of each separation passage 19.

When the cooking fume separation device 10 of embodiments of the present disclosure is applied to the fume exhaust device 100, a relative position of the first bracket 12 and the second bracket 14 can be manually or automatically adjusted according to an air volume of a fan 20 of the fume exhaust device 100, and thus the size of the separation passage 19 can be adjusted, such that the resistance of the cooking fume separation device 10 to the cooking fume will be reduced, and the cooking fume extraction effect will be improved, and meanwhile the noise will be smaller, thereby promoting the user experience.

In one embodiment, the cooking fume airflow flows to the separation passage 19 after entering the cooking fume separation device 10. When the air volume of the fan 20 of the fume exhaust device 100 is relatively large, flow within the separation passage 19 increases, in which case the separation passage 19 can become larger by adjusting the relative position of the first bracket 12 and the second bracket 14, so as to avoid a larger resistance caused by an excessively small separation passage 19 from affecting the cooking fume extraction effect. Similarly, when the air volume of the fan 20 of the fume exhaust device 100 is relatively small, the flow within the separation passage 19 is small, but the cooking fume passage is relatively and excessively large, the separation passage 19 can become smaller by adjusting the relative position of the first bracket 12 and the second bracket 14, such that the number of collisions between cooking fume particulates in the cooking fume airflow is increased, and more cooking fume particulates are allowed to be attached to the first separation plate 16 and/or the second separation plate 18, thereby ensuring that the cooking fume separation effect is not affected by the magnitude of the air volume of the fan 20.

Further, the cooking fume separation device 10 of the present disclosure has a simple structure, and is easy to clean, so as to save a user's cleaning time and improve the user experience.

Referring to FIGS. 1 to 4, in some embodiments, the first bracket 12 includes a first horizontal bar 122 and two first vertical bars 124 perpendicular to the first horizontal bar 122 and located at two ends of the first horizontal bar 122, and the plurality of first separation plates 16 are secured to the first horizontal bar 122;

The second bracket 14 includes a second horizontal bar 142 and two second vertical bars 144 perpendicular to the second horizontal bar 142 and located at two ends of the second horizontal bar 142, and the plurality of second separation plates 18 are secured to the second horizontal bar 142, The second vertical bar 144 defines a groove 1442 in a vertical direction, an end of the first horizontal bar 122 and the first vertical bar 124 are slidably embedded in the groove 1442.

Thus, the second bracket 14 can slide along the first vertical bar 124, and the size of the separation passage 19 can be adjusted according to the magnitude of the air volume of the fan 20 of the fume exhaust device 100, so as to obtain better cooking fume separation effect.

In one embodiment, the plurality of first separation plates 16 disposed to the first horizontal bar 122 and the plurality of second separation plates 18 disposed to the second horizontal bar 142 are staggered and spaced apart in the up-down direction, so as to form the separation passages 19.

In some embodiments, the first separation plate 16 and the second separation plate 18 are strip-shaped, a middle portion of the first separation plate 16 is fixedly connected to the first horizontal bar 122, and a middle portion of the second separation plate 18 is fixedly connected to the second horizontal bar 142.

Thus, the first horizontal bar 122 provides mounting support for the first separation plate 16, such that the first separation plate 16 is stably mounted to first horizontal bar 122; the second horizontal bar 142 provides mounting support for the second separation plate 18, such that the second separation plate 18 is stably mounted to the second horizontal bar 142.

In some embodiments, a section of the first separation plate 16 is arc-shaped, and a section of the second separation plate 18 is arc-shaped.

Thus, the separation passage 19 formed by arc-shaped separation plates produces a relatively small resistance to the cooking fume airflow.

In one embodiment, the first separation plate 16 and the second separation plate 18 are designed to be arc-shaped without dead corner, such that it is convenient for the user to clean the first separation plate 16 and the second separation plate 18, and the cleaning is more thorough, so as to avoid bacteria accumulation caused by retention of the cooking fume blot in the dead corner.

Further, a concave surface of the first separation plate 16 is disposed towards an inner side of the cooking fume separation device 10, and a concave surface of the second separation plate 18 is disposed towards the inner side of the cooking fume separation device 10.

In some embodiments, each separation passage 19 includes a first turning section 192 and a second turning section 194 connected sequentially in an airflow direction, the first turning section 192 is configured to turn the airflow through 180 degrees, and the second turning section 194 is configured to turn the airflow output by the first turning section 192 through 180 degrees.

Thus, the cooking fume airflow is turned through 180 degrees twice after entering the separation passage 19, such that the cooking fume particulates are more easily attached to the first separation plate 16 and the second separation plate 18, thereby improving the cooking fume separation effect.

In one embodiment, the cooking fume airflow is turned through 180 degrees twice, such that the flow of the cooking fume airflow become turbulent, the turbulent flow becomes stronger, the probability of the collisions among the cooking fume particulates is also promoted, and the cooking fume particulates are accumulated to form a large particulate, which is easier to be separated from the cooking fume airflow.

Further, the cooking fume separation device 10 includes a plurality of gas inlets 196 and a plurality of gas outlets 198, the gas inlet 196 is communicated with the first turning section 192, and the gas outlet 198 is communicated with the second turning section 194.

In some embodiments, the first bracket 12 and the second bracket 14 are detachably connected.

Thus, when the cooking fume attached to the cooking fume separation device 10 needs to be cleaned, the cooking fume separation device 10 can be detached conveniently and rapidly. Since the first separation plate 16 and the second separation plate 18 are spaced apart, the cleaning space will also become larger, which is convenient for the user to clean the blot within the cooking fume separation device 10.

In one embodiment, when the cooking fume separation device 10 is detached, as long as the first bracket 12 and the second bracket 14 are disassembled, the cooking fume separation device 10 can be divided into two parts (the first bracket 12 and the first separation plates 16 fixedly connected to the first bracket 12, as well as the second bracket 14 and the second separation plates 18 fixedly connected to the second bracket 14) for cleaning. After completion of the cleaning, just mount the first bracket 12 and the first separation plates 16 fixedly connected to the first bracket 12 to an original position again. This disassembly and assembly process is easy and convenient, which can be completed by a non-specialized person.

The fume exhaust device 100 according to embodiments of the present disclosure includes a cooking fume separation device 10 according to any embodiment described above.

For the fume exhaust device 100 of the embodiments of the present disclosure, the relative position of the first bracket 12 and the second bracket 14 can be manually or automatically adjusted according to the air volume of the fan 20 of the fume exhaust device 100, and thus the size of the separation passage 19 can be adjusted, such that the resistance of the cooking fume separation device 10 to the cooking fume will be reduced, and the cooking fume extraction effect will be improved, and meanwhile the noise will be smaller, thereby promoting the user experience.

In one example, the fume exhaust device is a range hood.

Figure 5:
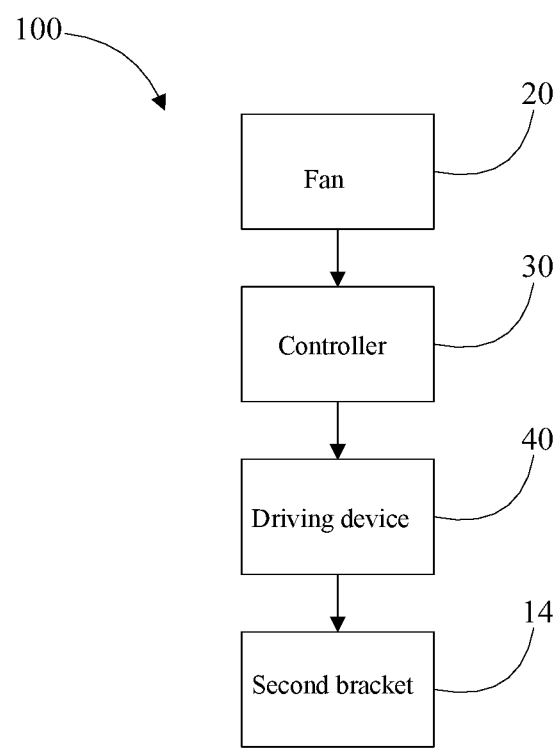
FIG. 5 is a schematic view of functional devices of a fume exhaust device of an embodiment of the present disclosure.

Referring to FIG. 5, in some embodiments, the fume exhaust device 100 includes the fan 20, a controller 30 and a driving device 40. The controller 30 is used to control the driving device 40 to adjust the relative position of the first bracket 12 and the second bracket 14 according to a rotating speed of the fan 20.

Thus, the controller 30 controls the relative position of the first bracket 12 and the second bracket 14 in real time according to the air volume of the fan 20, so as to adjust the size of the separation passage 19.

In one embodiment, when a speed level of the fan 20 is increased by the user, then the controller 30 controls the driving device 40 to adjust the relative position of the first bracket 12 and the second bracket 14, such that the separation passage 19 become larger, and a resistance caused by the cooking fume airflow of the separation passage 19 is reduced. Conversely, when the speed level of the fan 20 is decreased by the user, the controller 30 then controls the driving device 40 to adjust the relative position of the first bracket 12 and the second bracket 14, such that the separation passage 19 become smaller, thereby ensuring the cooking fume separation effect.

In one example, the driving device 40 can drive the second bracket 14 to move relative to the first bracket 12. In some embodiments, an inner side surface of the second vertical bar 144 may be fixed with a rack, the driving device 40 drives the rack through a gear assembly to bring the second bracket 14 to move relative to the first bracket 12. For example, the driving device 40 is an electric motor.

In some embodiments, the fume exhaust device 100 includes a flue 50. The cooking fume separation device 10 is mounted to an inner wall of the flue 50, and the separation passage 19 is communicated with the flue 50.

Thus, the cooking fume separation device 10 is mounted to the flue 50, the cooking fume flows to the cooking fume separation device 10 for cooking fume separation after entering the fume exhaust device 100, and the separated airflow is discharged from the flue 50, thereby protecting the environment and reducing the cleaning burden of the user.

In some embodiments, the flue 50 includes a gas inlet section 52, the gas inlet section 52 is in a tapered shape along a cooking fume airflow direction, and the first bracket 12 is mounted to an inner wall of the gas inlet section 52.

Thus, the cooking fume separation device 10 is mounted at the tapered gas inlet section 52, such that the cooking fume enters the cooking fume separation device 10 at a relatively large flow velocity, which increases the probability of collisions among cooking fume particulates and the probability of attaching the cooking fume particulates to the first separation plate 16 and/or the second separation plate 18.

In one embodiment, in one example, the first vertical bar 124 is fixedly connected to the inner wall of the gas inlet section 52.

Reference throughout this specification to "an embodiment," "some embodiments," "an illustrative embodiment," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more of this feature. In the description of the present disclosure, the term "a plurality of" means two or more than two, unless specified otherwise.

What is claimed is:

1. A cooking fume separation device for a fume exhaust device, comprising:
   a first bracket;
   a second bracket;
   a plurality of first separation plates; and
   a plurality of second separation plates,
   wherein the plurality of first separation plates being fixedly connected to the first bracket, the plurality of second separation plates being fixedly connected to the second bracket, the plurality of first separation plates and the plurality of second separation plates being staggered and spaced apart in an up-down direction, the first separation plate and the second separation plate partially covering each other to form a plurality of separation passages, and the first bracket and the second bracket being movably connected so as to adjust a size of each separation passage;
   wherein the first bracket comprises a first horizontal bar and two first vertical bars perpendicular to the first horizontal bar and located at two ends of the first horizontal bar, and the plurality of first separation plates are secured to the first horizontal bar;
   wherein the second bracket comprises a second horizontal bar and two second vertical bars perpendicular to the second horizontal bar and located at two ends of the second horizontal bar, and the plurality of second separation plates are secured to the second horizontal bar;
   wherein the second vertical bar defines a groove in a vertical direction, an end of the first horizontal bar and the first vertical bar are slidably embedded in the groove;
   wherein the second bracket is configured to slide along the first vertical bar to manually or automatically adjust a relative position of the first bracket and the second bracket according to air volume passing through the plurality of separation passages.

2. The cooking fume separation device according to claim 1, wherein the plurality of first separation plates disposed to the first horizontal bar and the plurality of second separation plates disposed to the second horizontal bar are staggered and spaced apart in the up-down direction, so as to form the separation passages.

3. The cooking fume separation device according to claim 1, wherein the first separation plate and the second separation plate are strip-shaped, a middle portion of the first separation plate is fixedly connected to the first horizontal bar, and a middle portion of the second separation plate is fixedly connected to the second horizontal bar.

4. The cooking fume separation device according to claim 1, wherein a section of the first separation plate is arc-shaped, and a section of the second separation plate is arc-shaped.

5. The cooking fume separation device according to claim 4, wherein a concave surface of the first separation plate is disposed towards an inner side of the cooking fume separation device, and a concave surface of the second separation plate is disposed towards the inner side of the cooking fume separation device.

6. The cooking fume separation device according to claim 1, wherein each separation passage comprises a first turning section and a second turning section connected sequentially in an airflow direction, the first turning section is configured to turn the airflow through 180 degrees, and the second turning section is configured to turn the airflow output by the first turning section through 180 degrees.

7. The cooking fume separation device according to claim 6, wherein the cooking fume separation device comprises a plurality of gas inlets and a plurality of gas outlets, the gas inlet is communicated with the first turning section, and the gas outlet is communicated with the second turning section.

8. The cooking fume separation device according to claim 1, wherein the first bracket and the second bracket are detachably connected.

9. A fume exhaust device, comprising:
   a cooking fume separation device, comprising:
   a first bracket;
   a second bracket;
   a plurality of first separation plates; and
   a plurality of second separation plates,
   wherein the plurality of first separation plates being fixedly connected to the first bracket, the plurality of second separation plates being fixedly connected to the second bracket, the plurality of first separation plates and the plurality of second separation plates being staggered and spaced apart in an up-down direction, the first separation plate and the second separation plate partially covering each other to form a plurality of separation passages, and the first bracket and the second bracket being movably connected so as to adjust a size of each separation passage;
   wherein the first bracket comprises a first horizontal bar and two first vertical bars perpendicular to the first horizontal bar and located at two ends of the first horizontal bar, and the plurality of first separation plates are secured to the first horizontal bar;

wherein the second bracket comprises a second horizontal bar and two second vertical bars perpendicular to the second horizontal bar and located at two ends of the second horizontal bar, and the plurality of second separation plates are secured to the second horizontal bar;

wherein the second vertical bar defines a groove in a vertical direction, an end of the first horizontal bar and the first vertical bar are slidably embedded in the groove;

wherein the second bracket is configured to slide along the first vertical bar to manually or automatically adjust a relative position of the first bracket and the second bracket according to air volume passing through the plurality of separation passages.

10. The fume exhaust device according to claim 9, comprising a fan, a controller and a driving device, the controller being configured to control the driving device to adjust the relative position of the first bracket and the second bracket according to a rotating speed of the fan;

the driving device is configured to drive the second bracket to move relative to the first bracket.

11. The fume exhaust device according to claim 9, comprising a flue, the cooking fume separation device being mounted to an inner wall of the flue, and the separation passage being communicated with the flue.

12. The fume exhaust device according to claim 11, wherein the flue comprises a gas inlet section, the gas inlet section is in a tapered shape along a cooking fume airflow direction, and the first bracket is mounted to an inner wall of the gas inlet section.

13. The fume exhaust device according to claim 10, wherein an inner side surface of the second vertical bar is fixed with a rack, the driving device drives the rack through a gear assembly to cause the second bracket to move relative to the first bracket.

14. The fume exhaust device according to claim 10, wherein the driving device is an electric motor.

* * * * *